3,526,397
TOOLING FIXTURE
Leo E. Verguson, 2333 W. Lincoln,
Birmingham, Mich.
Filed Dec. 27, 1966, Ser. No. 604,840
Int. Cl. B23p 3/22
U.S. Cl. 269—7        5 Claims

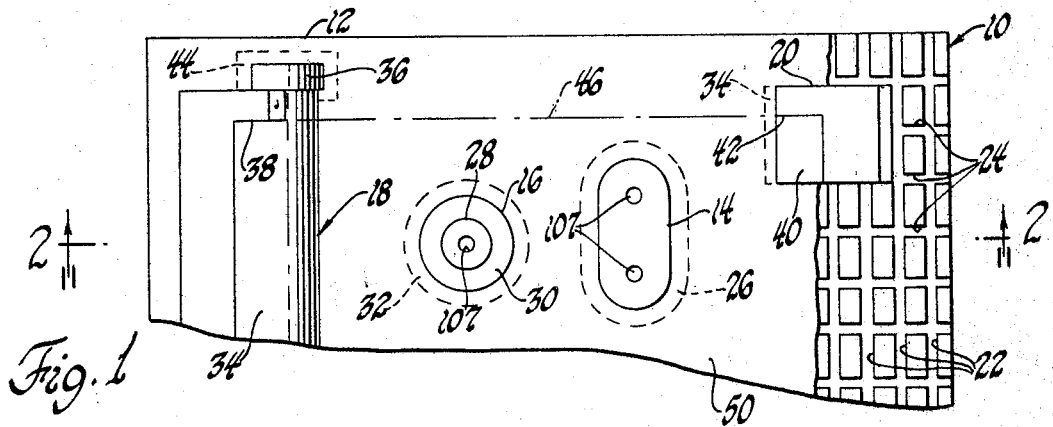
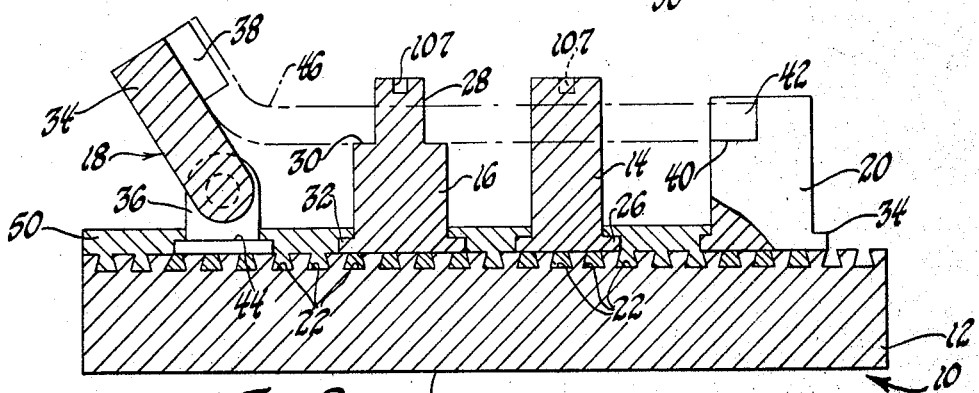
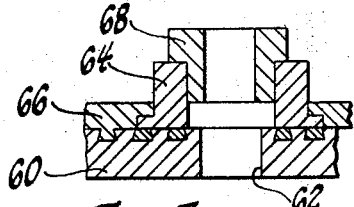
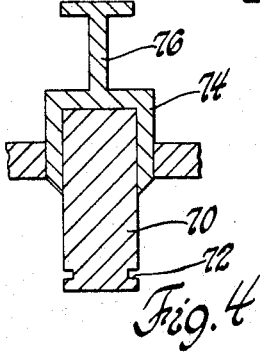
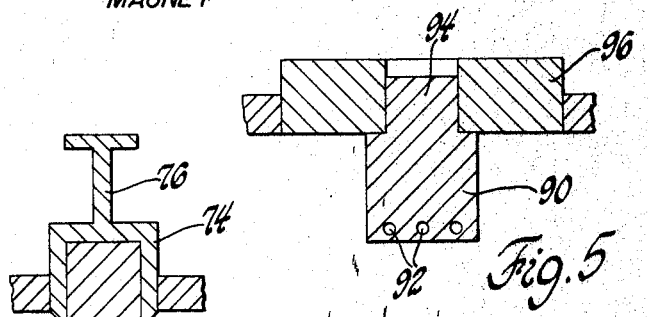
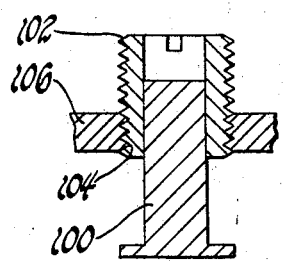
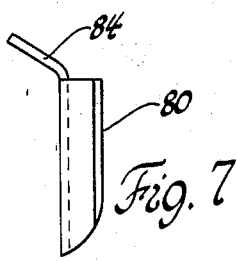
INVENTOR.
Leo E. Verguson
BY
Dale A. Winnie
ATTORNEY

United States Patent Office 3,526,397
Patented Sept. 1, 1970

ABSTRACT OF THE DISCLOSURE

A work tool fixture, which allows relative arrangement, rearrangement, and salvage of fixture making parts thereof, and which includes a base member with a planular surface having a plurality of undercut recesses provided therein, parts that are pre-positioned as and where desired on the recessed surface, and an initially fluid bonding material, which solidifies at room temperatures, and that is received in the recesses and about the lower extremities of the fixture making parts to fix their relative location on the base member.

---

This invention relates to tools and fixtures in general and more particularly to a means and method of constructing a tooling fixture or the like with components which may be standardized and later salvaged for reuse in other assemblies.

Normally, the construction of a tooling fixture for a particular part involves the placement of various fixture details in correct relation to each other and to known reference planes on the framework or base plate of the fixture.

If the fixture is to be used in fabricating parts or assembling them, the fixture details will include means to locate and hold the workpiece or to locate and facilitate machining of the workpiece, such as drill bushings or hollow bushing holders, or other means to serve as a guide in machining the periphery of the workpiece.

If the fixture is to be used in inspecting workpieces, the fixture must be made to include means to outline the desired periphery, to show correct locations and sizes of openings in the workpiece, and to define relations between different planes of the workpiece to be inspected.

The conventional method of preparing jigs and fixtures involves considerable tool design work in making the drawings, machining the fixture components, and locating the fixture components by precision machining of mounting holes in the base plate or fixture framework. This is a time consuming and very expensive process and, in many cases, the fixture costs may be a large part of the overall job cost. Seldom is a jig or fixture, used for one job, usable in any other instance, either in whole or in part.

To be able to save some cost in this regard, fixtures have been proposed with parts which clamp onto a base member. The most common such arrangement is probably one which uses undercut slots intersecting each other and using clamping devices which are retained in the slots and are still relatively adjustable.

As will be appreciated, any type of fixture which uses parts that are clamped in place may be subject to disarrangement if one of the clamps becomes loose and accordingly they are not too satisfactory. Further, the machining costs and space requirements for the clamping provision tend to limit the usage of this arrangement.

Generally speaking, only those fixtures which have the components fixed in place can be considered satisfactory.

It is an object of this invention to provide a means and a method for building up to a tooling fixture by the assembly of reusable items and wherein the various parts are fixed in place once they are properly located.

To be more specific, it is an object of this invention to teach the method of making a fixture which includes providing a base member with a plurality of recesses, or a continuous recess, so formed as to exert a locking effect on material solidified therein, positioning fixture parts on the base member, and then using a substantially fluid material to cover the lower ends of the fixture parts and the adjacent portions of the base member so that they are locked together when the material solidifies. The fixture parts are flanged, undercut, tapered, threaded, or provided with holes so that they are locked in the solidified material and the solidified material is itself locked to the base member by means of the locking recesses provided therein.

Numerous different fixture components may be used and their initial positioning on the base member may be facilitated by magnetizing the base to retain them in selected positions.

To salvage the fixture details and the base member, the locking material is softened by the application of heat or chemicals or it may be removed by mechanical means, or a combination thereof. The method used will be determined by the nature of the locking material and the facilities available. Special tools may be used to concentrate heat or chemicals in a given area to change a given part of the fixture without disturbing others.

These and other objects and advantages in the practice of this invention will be more clearly and fully understood in the following description having reference to the embodiment shown in the accompanying drawings.

In the drawing:

FIG. 1 is a top plan view of a part of an inspection fixture made in accord with the teachings of this invention.

FIG. 2 is a side elevation and cross-sectional view of the fixture of the first drawing figure, as seen in the plane of line 2—2 thereon, and with a workpiece shown in phantom as used therewith.

FIGS. 3–8 show various different inspection pieces for use in the fixture building system proposed.

The work tool fixture 10 shown in the first two drawing figures, in part, illustrates the principle involved in the practice of this invention.

A base plate member 12 is shown with inspection parts 14, 16 and 18 disposed thereon as well as a corner support block 20. The inspection parts 14 and 16 are to gauge an oblong and circular hole, respectively, and the other part 18 is to gauge an angle; as for the workpiece 46 shown in phantom in the second drawing figure.

The base plate member may be of any size and shape but is preferably square or rectangular with straight plain side walls and square corners to facilitate location in and relative to other jigs and fixtures. The thickness of the base plate member 12 is also immaterial beyond that which enables stock removal from the surface.

Although shown as a plane surfaced member, the base plate member 12 may have more than one mounting surface on which it receives and holds inspection parts. They may be at different elevations or even adjustable relative to each other. In most instances the mounting surfaces will be planular. However, variations are conceivable as will later be described.

The mounting surface of the base plate member 12 is formed to include a plurality of recesses so shaped as to have a locking effect on material solidified therein. The recesses may be slots, grooves or holes, preferably with an undercut configuration, to exert a substantial locking effect on the material later solidified therein. The term plurality of recesses includes any continuous recess or slot so constructed as to produce substantially the same locking effect as a plurality of recesses. The intersecting slots 22 and 24 shown, intersect each other and are reasonably closely spaced and undercut as best shown in FIG. 2.

The inspection parts 14, 16 and 18 and the corner support block 20 are each placed on the mounting surface of the base plate member 12 for a particular purpose. Their location is commensurate with the workpiece they are to be used with and the function they are to serve.

The inspection part 14 is oblong in cross-section, for gauging a like hole in a workpiece, and includes a flange 26 about its lower end that provides a base which spans several of the undercut slots 22 and 24.

The part 16 is cylindrical with its upper end 28 of smaller cross-section, for gauging a round hole, and to provide a shoulder area 30 for supporting the workpiece. A flange 32 is provided about its lower end as on the inspection part 14.

The corner support block 20 is to gauge a square corner and locate the workpiece relative to the other inspection parts. It will be noted as having a flange 34 provided on two opposite sides at its lower end but not extending all the way around.

As will be explained later, the flanges 26, 32 and 34 on the inspection parts provide locking shoulders for retaining the parts in place. Although the flange shoulders are preferred, several other interlocking means may be used.

The inspection part 18 includes two trunnion supports 36, only one of which is shown, and between which is supported a member 34 that may be accurately set at a given angular position for gauging purposes (by means not shown). A side wall stop 38 is provided on the adjustable member and is shown to register with the side wall 42 of the corner seat 40 in the support block 20.

The trunnion supports 36 include a flange 44 about their lower ends, as mentioned for the other inspection parts.

The different parts 14, 16, and 18 and 20 may be positioned on the base plate member by use of a master templet 46 or otherwise. Parts 14 and 16 are provided with holes 107 in their upper ends which may also serve as positioning aids. Once positioned as desired, however, each of the parts must be held until securely locked in place.

This may be accomplished by using a base plate that may be permanently or temporarily magnetized and having inspection parts which are responsive thereto. Electromagnetic means of providing a magnetic field are best since the strength of the field may be as powerful as necessary. However, the principal object is just to hold the parts in position on the base plate until they are locked securely in place.

After the parts of the fixture are positioned on the base plate member where desired, by whatever means, they are locked in position by use of a temporarily fluid material 50 which may be provided on the mounting surface of the base plate to fill the undercut slots 22 and 24 and cover the lower extremities of the parts before solidifying.

Any of a number of fusible alloys with reasonably low melting points may be used including solder, Cerrobend, which is the trademark of a low melting alloy commercially available from the Cerro Corporation of New York, and the eutectic fusible alloys which include bismuth, lead and tin or cadmium and melt at temperatures of 70°–103° centigrade.

Thermo-plastic plastic materials such as Plexiglas, methyl methacrylate and linear polyethylene may also be used.

Several other plastic and metal materials may also be used, where more holding strength is needed, or for other reasons, but a balance between holding strength and ease of removal should always be kept in mind.

In each instance the important thing is that the locking or bonding material be capable of being fluid at modest temperatures to flow under and around the parts mounted on the base plate member and that it will solidify and provide an impregnable bond at normal work room temperatures.

When the bonding or locking material solidifies, it is keyed to the base plate by the undercut slots 22 and 24 and the parts mounted on the base plate are locked within it by having their flanged or otherwise formed lower extremities imbedded therein.

With relatively small sized fixtures using a plane surfaced base plate member, the bonding material in its fluid condition may be provided over the whole mounting surface. However, in other instances, where parts are spaced some distance apart the bonding material need only be used about the part to be retained.

It follows that parts may be moved or changed to reconstruct a fixture without scrapping the whole job and starting over. This may be by melting the bonding materials or reducing it to a fluid state with chemicals, if plastic, to remove it and reposition it or another part in its place.

In general, as with solder, the fusible material may be built-up around a part in any position on the slotted base plate and the base plate may include elevated, inclined and various mounting surfaces which can be horizontally disposed while the attachment is made.

Special tools and equipment may be provided to provide the fluid material from a gun device or the like, to concentrate heat in a given area, or apply necessary reducing chemicals for plastics, etc.

FIG. 3 shows the use of the present invention for a drill fixture. The base plate 60 for the fixture includes a clearance hole 62 over which is disposed a hollow post member 64 held to the base plate by the bonding material 66. Supported on the post 64 is a drill bushing 68 of the desired size and through which a metal working drill bit is assured alignment with a workpiece (not shown) under the base plate. Several hollow parts may be used on a base plate to facilitate the machining of holes in precise relation to each other and to the workpiece reference planes. Such hollow posts may be used as drill guides with or without the bushings, of course, as desired.

The inspection pin 70 is one to simulate a part received in a hole and having annular clearance thereabound. Accordingly, it makes use of a secondary part 74 to gauge the annular clearance and such secondary part includes a T-bar handle 76 for greater handling ease.

Another type of device for measuring smaller clearances is the shim gauge 80 of FIGS. 7 and 8. This includes an arcuate part 82 of minimum thickness and formed to include a handle 84. These shims would be made in different sizes and thickness to measure different clearance dimensions between curved surfaces such as the inspection pin 28 and its corresponding hole.

FIG. 5 shows an inspection part 90 which has holes 92 drilled through it near its lower extremity for bonding purposes. This takes the place of the flange or undercut groove previously described.

The inspection part 90 may be of any shape and has an upper part 94 of smaller cross-section on which is received a secondary inspection part 96. The latter may be of a different shape, regular or irregular and is keyed to the lower post part 90 by the smaller upper end.

FIG. 6 shows a threaded post part 100 with a threaded bushing part 102 to gauge a threaded hole 104 in a workpiece 106.

From the foregoing, it will be appreciated that a whole new system of fixture building is conceivable in the practice of this invention.

Base plates of different sizes may be made and provision made for clamping them together, beside each other, in tandem, at angular dispositions, etc. Inspection parts of every conceivable type may be made, with versatility in different parts, and with different or like locking bases. The bonding material may be readily applied and removed so that there is complete salvage of the fixture parts.

New and different fixtures can be constructed from the same parts, fixtures can be changed and modified, and in all instances the fixture as finally constructed will have every permanence and dependability of commonly known fixtures made by other more complicated and expensive methods.

I claim:

1. A work tool fixture, comprising:

a base member having recesses provided therein over substantially the whole mounting surface thereof, parts received and positioned as desired on the mounting surface of said base member and having the lower extremities thereof formed for locking engagement with means received within said recesses, and an initially fluid bonding material, capable of solidifying at normal room temperatures, received within said recesses adjacent said parts and extending over and about the lower extremities of said parts and retaining said parts in locked engagement with said base member.

2. The work tool fixture of claim 1, said base member including transverse and longitudinal slots forming said recesses and being undercut throughout substantially the full length thereof.

3. The work tool fixture of claim 1, said parts having the lower extremities thereof formed to include a laterally extending flange over which said bonding material is received and within which it is firmly imbedded.

4. The work tool fixture of claim 1, including;

means for producing a magnetic field on the mounting surface of said base member and said parts being responsive thereto for pre-fixed positioning of said parts on said base member.

5. A tooling fixture constructed of reusable parts and comprising;

a base plate member having a planular surface providing a mounting surface for fixture parts, intersecting transverse and longitudinal grooves having an undercut and formed in said planular surface, fixture parts received in free standing engagement on said mounting surface and freely positioned as desired thereon, said base plate member being magnetized for holding said fixture parts in desired positions, said undercut grooves being sufficiently closely spaced for extending under said fixture parts at least in part, said fixture parts having the lower extremities thereof formed to include locking shoulders and flanges, and a low temperature fusible material received within said undercut grooves covering said locking shoulders and flanges of said fixture parts while in a fluid state and locking said fixture parts to said base plate upon solidification.

References Cited

UNITED STATES PATENTS 1,882,755   10/1932   Boynton _____ 269—7 X
2,621,807   12/1952   Rendich.

WILLIAM S. LAWSON, Primary Examiner

L. GILDEN, Assistant Examiner

U.S. Cl. X.R.

29—460; 77—62; 269—296, 319